(12) United States Patent
Kim et al.

(10) Patent No.: US 8,872,499 B2
(45) Date of Patent: Oct. 28, 2014

(54) POWER SUPPLY APPARATUS

(75) Inventors: Duk You Kim, Seoul (KR); Gun Woo Moon, Daejeon (KR); Chong Eun Kim, Daejeon (KR); Don Sik Kim, Gyunggi-do (KR)

(73) Assignees: Samsung Electro-Mechanics Co., Ltd., Suwon, Gyunggi-Do (KR); Korea Advanced Institute of Science and Technology, Daejeon (KR)

( * ) Notice: Subject to any disclaimer, the term of this patent is extended or adjusted under 35 U.S.C. 154(b) by 109 days.

(21) Appl. No.: 13/483,724

(22) Filed: May 30, 2012

(65) Prior Publication Data
US 2012/0307535 A1 Dec. 6, 2012

(30) Foreign Application Priority Data
May 30, 2011 (KR) .................. 10-2011-0051373

(51) Int. Cl.
*H02M 3/158* (2006.01)
*H02M 1/00* (2006.01)

(52) U.S. Cl.
CPC ........ *H02M 3/158* (2013.01); *H02M 2001/007* (2013.01); *H02M 2001/0022* (2013.01); *Y02B 70/1425* (2013.01)
USPC .......................................... 323/299; 323/266

(58) Field of Classification Search
USPC ............ 363/89, 125, 127; 323/205, 207, 266, 323/271, 299
See application file for complete search history.

(56) References Cited

U.S. PATENT DOCUMENTS

| 7,009,852 B2 * | 3/2006 | Ying et al. ..................... 363/17 |
| 8,089,253 B2 * | 1/2012 | Murtojarvi ................... 323/224 |
| 2009/0237967 A1 * | 9/2009 | Huang ............................ 363/79 |

FOREIGN PATENT DOCUMENTS

| CN | 101689806 A | | 3/2010 |
| JP | 08149805 A | * | 6/1996 |
| KR | 10-2005-0113244 A | | 12/2005 |
| KR | 10-2009-0055697 A | | 6/2009 |
| TW | 200505139 | | 2/2005 |

OTHER PUBLICATIONS

Abstract Translation for JP 08149805 A, Kaneda, Mitsuo. 1996.*
Korean Office Action, and English translation thereof, issued in Korean Patent Application No. 10-2011-0051373 dated Jun. 27, 2012.
Oh, Eun-Tae et al. "2kW Bidirectional DC-DC Converter for Fuel Cell using Unregulated LLC Resonant Converter." The Journal of Power Electronics Annual Conference. pp. 78-80. Nov. 2009.
Chinese Office Action issued in Chinese Application No. 201210008728.X dated Apr. 1, 2014, w/English translation.

* cited by examiner

*Primary Examiner* — Gary L Laxton
(74) *Attorney, Agent, or Firm* — McDermott Will & Emery LLP

(57) ABSTRACT

There is provided a power supply apparatus supplying driving power. The power supply apparatus includes: a first power converter bypassing input power when a voltage level of the input power having a predetermined voltage level is within a reference voltage level range, and converting the input power to DC power having a preset voltage level when the voltage level of the input power is outside of the reference voltage level range; and a second power converter converting the power inputted from the first power converter to driving power having a preset voltage level.

15 Claims, 3 Drawing Sheets

POWER SUPPLY APPARATUS

CROSS-REFERENCE TO RELATED APPLICATIONS

This application claims the priority of Korean Patent Application No. 2011-0051373 filed on May 30, 2011, in the Korean Intellectual Property Office, the disclosure of which is incorporated herein by reference.

BACKGROUND OF THE INVENTION

1. Field of the Invention

The present invention relates to a power supply apparatus for supplying driving power.

2. Description of the Related Art

In general, in order to drive electronic devices, a power supply apparatus for supplying driving power necessary for the operation of the electronic apparatus is required.

A power supply apparatus usually converts commercial alternating current (AC) power into direct current (DC) power to supply the DC power to the electronic apparatus as driving power. A power conversion circuit directly converts commercial AC power to driving power. However, a voltage level thereof, at which relatively high power conversion efficiency can be maintained, is limited, and thus, it may be difficult to maintain high power conversion efficiency with respect to a wide input voltage level range. In addition, when multi-stage power conversion is performed, the power conversion is performed through several stages, causing power conversion efficiency to be lowered.

SUMMARY OF THE INVENTION

An aspect of the present invention provides a power supply apparatus capable of bypassing input power of a predetermined voltage range or converting it to a predetermined voltage depending on a voltage range of the input power at the time of multi-stage power conversion.

According to an aspect of the present invention, there is provided a power supply apparatus, including: a first power converter bypassing input power when a voltage level of the input power having a predetermined voltage level is within a reference voltage level range, and converting the input power to DC power having a preset voltage level when the voltage level of the input power is outside of the reference voltage level range; and a second power converter converting the power inputted from the first power converter to driving power having a preset voltage level.

The power supply apparatus may further include a controller stopping an operation of the first power converter to bypass the input power to the second power converter when the voltage level of the input power is within the reference voltage level range, and resuming a power conversion operation of the first power converter when the voltage level of the input power is outside of the reference voltage level range.

The first power converter maybe a buck converter having a voltage range from a minimum voltage level of the voltage level range of the input power to the voltage level of the DC power as the reference voltage level range.

The first power converter may be a boost converter having the voltage range from a voltage level of the DC power to a maximum voltage level of the voltage level range of the input power as the reference voltage level range.

The second power converter may be an inductor-inductor-capacitor (LLC) resonant converter having a maximum resonance point at the voltage level of the DC power.

The power supply apparatus may further include a power factor corrector rectifying and power factor correcting commercial AC power to supply the rectified and corrected power as the input power.

The second power converter may be a phase-shifted full-bridge (PSFB) converter.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
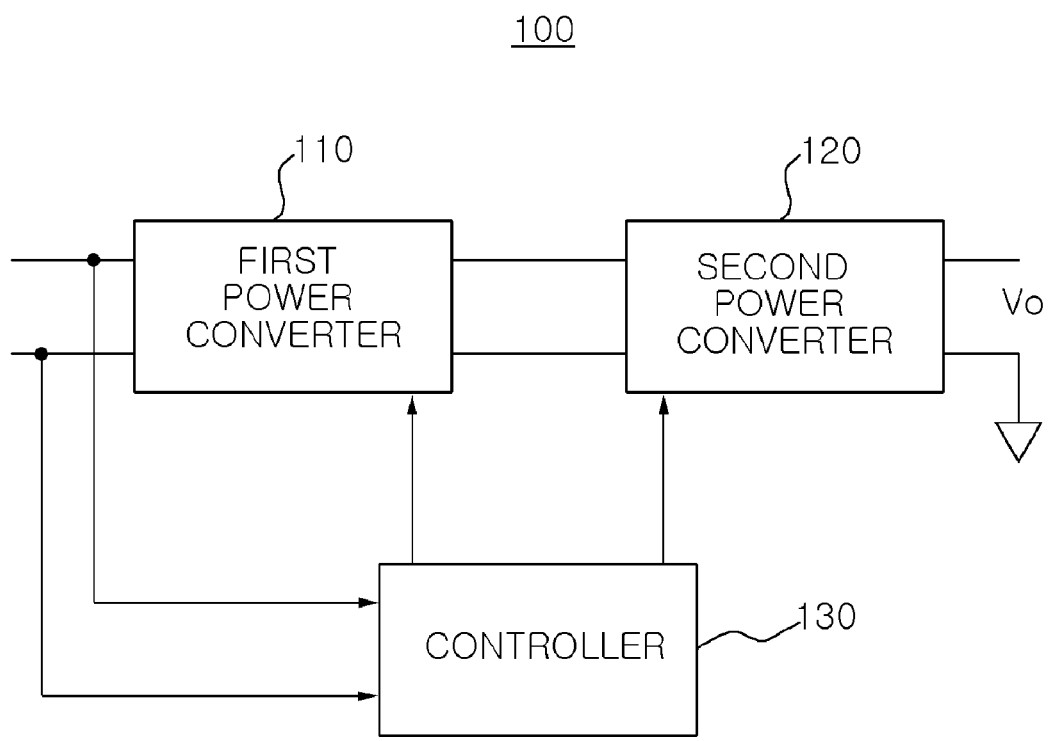
FIG. 1 is a schematic block diagram of a power supply apparatus of the present invention.

Embodiments of the present invention will now be described in detail with reference to the accompanying drawings.

The present invention should not be construed as being limited to the embodiments set forth herein and the embodiments detailed herein may be used to assist in understanding the technical idea of the present invention. Like reference numerals designate like components having substantially the same constitution and function in the drawings of the present invention.

FIG. 1 is a schematic block diagram of a power supply apparatus according to an embodiment of the present invention.

Referring to FIG. 1, a power supply apparatus 100 according to an embodiment of the present invention may include a first power converter 110, a second power converter 120, and a controller 130.

The first power converter 110 may convert a voltage level of input power. Here, the voltage level of the input power may be within a predetermined voltage level range, and the input power may be DC power.

The first power converter 110 may set a reference level range having a preset voltage level range, and may transmit the input power to the second power converter 120 when the voltage level of the input power is within the reference level range.

The first power converter 110 may convert the input power to DC power having a preset voltage level to transmit the DC power to the second power converter 120 when the voltage level of the input power is outside of the reference level range.

The second power converter 120 may convert the power inputted from the first power converter 110 to driving power Vo having a preset voltage level.

In other words, when the voltage level of the input power is within the reference level range, the first power converter 110 may bypass the input power and the second power converter 120 may convert the voltage level of the input power to output the driving power Vo. When the voltage level of the input power is outside of the reference level range, the first power converter 110 may transmit the DC power to the second power converter 120, and the second power converter 120 may convert the voltage level of the DC power to output the driving power Vo.

The controller 130 may detect the voltage level of the input power to determine whether or not the voltage level of the input power is within the reference level range.

The controller 130 may control the first power converter 110 to stop a power conversion operation thereof and to bypass the input power to the second power converter 120 when the voltage level of the input power is within the reference level range, and may control the first power converter 110 to perform the power conversion operation thereof when the voltage level of the input power is outside of the reference level range.

Figure 2A:
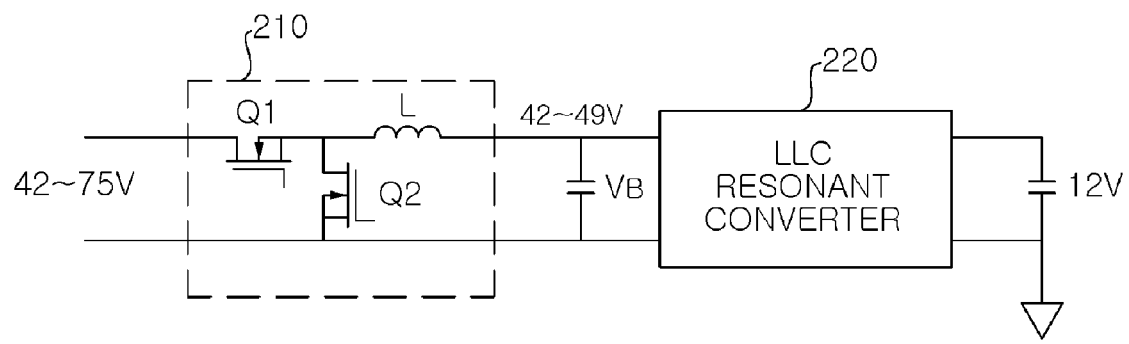
FIGS. 2A and 2B are schematic circuit block diagrams of a power supply apparatus according to an embodiment of the present invention.
Figure 2B:
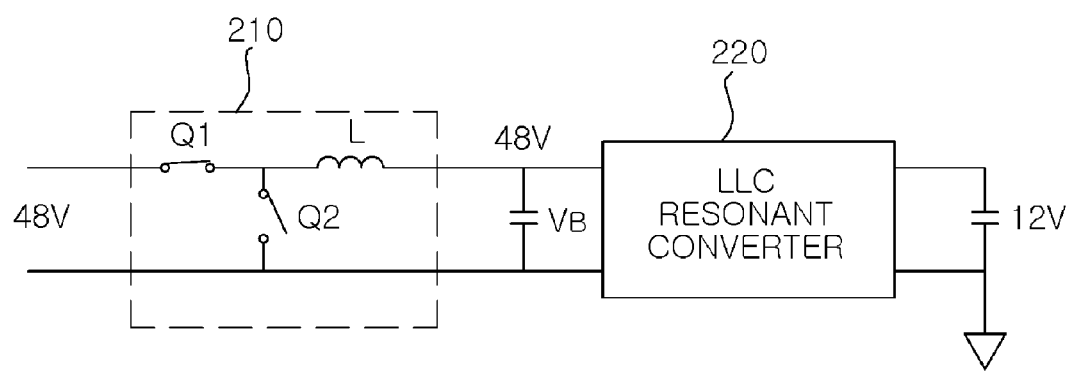

FIGS. 2A and 2B are schematic circuit block diagrams of a power supply apparatus according to an embodiment of the present invention.

Referring to FIG. 2A, in a power supply apparatus 200 according to an embodiment of the present invention, the first power converter 110 shown in FIG. 1 may be a buck converter 210 of lowering the voltage level of the input power, and the second power converter 120 shown in FIG. 1 may be an LLC resonant converter 220 having a preset maximum resonance point. The LLC resonant converter 220 may include a transformer converting power, and may use leakage inductance and magnetizing inductance of the transformer, and resonance between capacitors connected to the transformer, for power conversion. The controller 130 shown in FIG. 1 may perform the same function in the power supply apparatus according to one embodiment of the present invention, and thus, drawing and description thereof will be omitted.

For example, in a case in which the voltage level of the input power is 42V to 75V, the reference level range may be 42V to 49V. That is, in a case in which the voltage level of the input power is 42V to 49V, the buck converter 210 may stop operation of first and second switches Q1 and Q2 and an inductor L by control of the controller 130, thereby allowing the voltage level of the input power to be transmitted to the LLC resonant converter 220.

Here, the LLC resonant converter 220 may set a maximum resonance point to have a maximum resonance frequency at 49V of the voltage level from the buck converter 210. Since a method of setting a maximum resonance point in the LLC resonance converter 220 is known generally, detailed description thereof will be omitted.

Meanwhile, a maximum resonance point is generally set to a maximum voltage level of the inputted voltage level in the LLC resonant converter 220, but in the power supply apparatus 200 according to one embodiment of the present invention, the voltage level of the input power is varied by the buck converter 210, and then a maximum resonance point may be set to a maximum voltage level of the varied voltage level.

Therefore, when input power having a voltage level of 49V to 72V is inputted, the buck converter 210 may perform a lowering operation to transmit DC power having a voltage level of 49V, which is set as a maximum resonance point, to the LLC resonant converter 220, thereby maintaining relatively high power conversion efficiency of the LLC resonant converter 220.

Referring to FIG. 2B, in a case in which the voltage level of the input power is 48V, the voltage level of the input power is within the reference level range, and thus, the voltage of 48V may be transmitted to the LLC resonant converter 220, as it is. The voltage level of the DC power transmitted to the LLC resonant converter 220 is 48V, which is lower than 49V that is the voltage level of a maximum resonance point. However, since a difference therebetween is not great, power conversion efficiency of the LLC resonant converter 220 can be maintained high. For example, the situation is the same for a case in which the voltage level of the input power is 42V.

That is, when the buck converter 210 is employed, the voltage level of a maximum resonance point in the LLC resonant converter 220 maybe set to near a minimum voltage of the voltage level of the input power, thereby maintaining high power conversion efficiency of the LLC resonant converter 220 even at a voltage level within the reference level range, and the LLC resonant converter 220 is operated at a maximum resonance point at the voltage level being outside of the reference level range, thereby maintaining relatively high power conversion efficiency.

In addition, in the buck converter 210 as shown in FIGS. 2A and 2B, the first switch Q1 may gradually charge the DC power transmitted to the LLC resonant converter 220, and thus, it can be substituted for a switch of a hot swap bock, and the inductor L increases switching frequency to decrease a size thereof, and thus, a circuit occupation area of the buck converter 210 can be significantly reduced.

Figure 3:
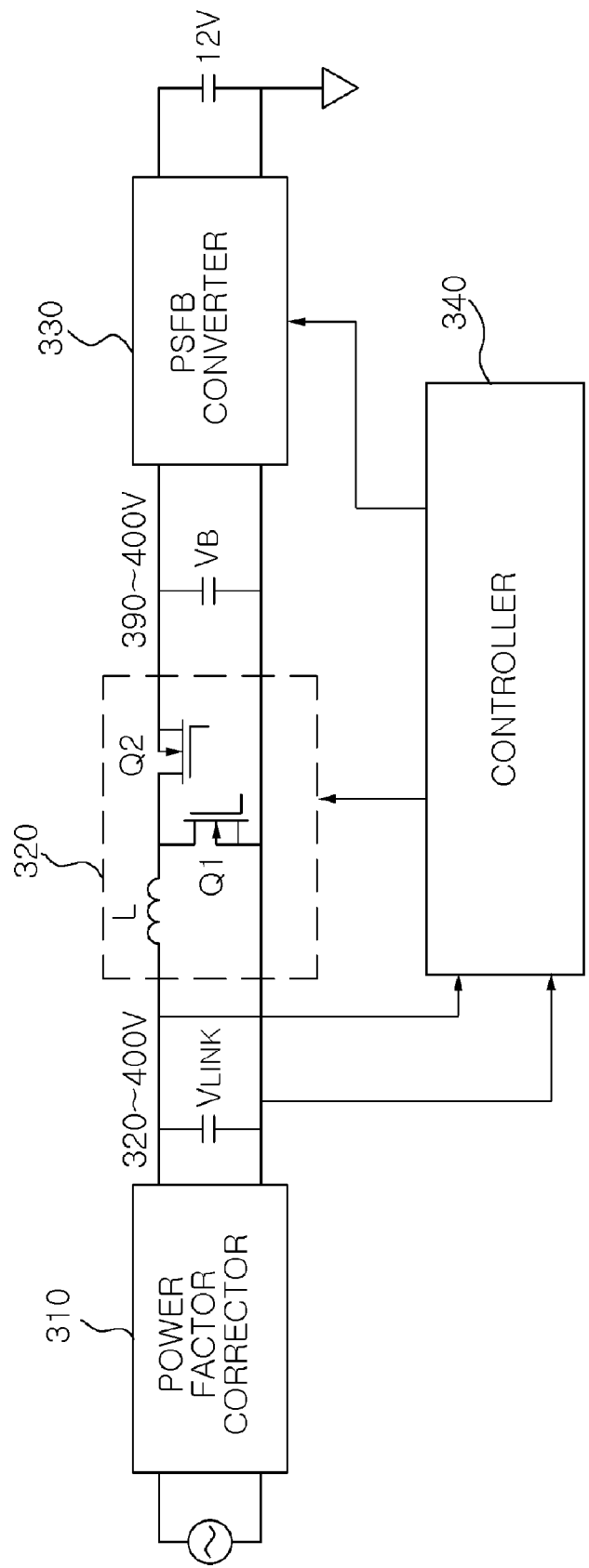
FIG. 3 is a schematic circuit block diagram of a power supply apparatus according to another embodiment of the present invention.

FIG. 3 is a schematic circuit block diagram of a power supply apparatus according to another embodiment of the present invention.

Referring to FIG. 3, a power supply apparatus 300 according to another embodiment of the present invention may employ a power factor corrector 310 for correcting a power factor by receiving a commercial AC power, rectifying the commercial AC power, and adjusting phase difference between voltage and current of the rectified power.

Referring to FIG. 3, in the power supply apparatus 300 according to another embodiment of the present invention, the first power converter 110 shown in FIG. 1 may be a boost converter 320 boosting the voltage level of the input power, and the second power converter 120 shown in FIG. 1 may be a phase-shifted full-bridge (PSFB) converter 330. Since a controller 340 shown in FIG. 3 performs the same function as the controller 130 shown in FIG. 1, detailed description thereof will be omitted.

For example, in a case in which the voltage level of the input power, which is power factor corrected by the power factor corrector 310 and then transmitted to the boost converter 320, is 320V to 400V, the reference level range may be 390V to 400V. That is, when the voltage level of the input power is 390V to 400V, the boost converter 320 may stop operation of first and second switches Q1 and Q2 and an inductor L according to control of the controller 340, to allow the voltage level of the input power to be transmitted to the phase-shifted full-bridge converter 330. Whereas, when the voltage level of the input power is 320V to 390V, the boost converter 320 may boost the voltage level to 390V and then transmit the boosted voltage level to the phase-shifted full-bridge converter 330.

Here, the phase-shifted full-bridge converter 330 may adjust duty of each switch of full bridge according to the voltage level of the input power, to output driving power having a preset voltage level. Since a method in which the duty of each switch of full bridge according to the voltage level of the input power is adjusted in the phase-shifted full bridge converter 330 is generally known, detailed description thereof will be omitted.

However, in the power supply apparatus 300 according to another embodiment of the present invention, the boost converter 320 may reduce the voltage level range of the input power and transmit the reduced voltage to the phase-shifted full-bridge converter 330, and the phase-shifted full-bridge converter 330 maybe operated at almost a maximum duty, thereby maintaining the power conversion efficiency near to relatively high power conversion efficiency.

As described above, according to embodiments of the present invention, a predetermined voltage range of the input power may be bypassed, or converted to a preset voltage, according to the voltage level of the input power at the time of multi-stage power conversion, and then transmitted to the LLC converter or the PSFB converter at the rear, to allow the LLC converter or the PSFB converter to be operated at near to a maximum operation point at which relatively high power conversion efficiency can be maintained, thereby maintaining high power conversion efficiency even though the voltage level of the input power is varied.

As set forth above, according to embodiments of the invention, a predetermined voltage range of the input power is bypassed, or converted to a preset voltage, according to the voltage level of the input power at the time of multi-stage power conversion, thereby maintaining relatively high power conversion efficiency of the LLC converter or the PSFB converter provided at the rear.

While the present invention has been shown and described in connection with the embodiments, it will be apparent to those skilled in the art that modifications and variations can be made without departing from the spirit and scope of the invention as defined by the appended claims.

What is claimed is:

1. A power supply apparatus, comprising:
    a first power converter bypassing input power when a voltage level of the input power having a predetermined voltage level is within a reference voltage level range, and converting the input power to direct current (DC) power having a preset voltage level when the voltage level of the input power is outside of the reference voltage level range; and
    a second power converter converting the power inputted from the first power converter to driving power having a preset voltage level and having a maximum resonance point at a voltage equal to the voltage level of the DC power.

2. The power supply apparatus of claim 1, further comprising a controller stopping an operation of the first power converter to bypass the input power to the second power converter when the voltage level of the input power is within the reference voltage level range, and resuming a power conversion operation of the first power converter when the voltage level of the input power is outside of the reference voltage level range.

3. The power supply apparatus of claim 1, wherein the first power converter is a buck converter having a voltage range from a minimum voltage level of the voltage level range of the input power to the voltage level of the DC power as the reference voltage level range.

4. The power supply apparatus of claim 1, wherein the first power converter is a boost converter having the voltage range from a voltage level of the DC power to a maximum voltage level of the voltage level range of the input power as the reference voltage level range.

5. The power supply apparatus of claim 1, further comprising a power factor corrector rectifying and power factor correcting commercial alternating current (AC) power to supply the rectified and corrected power as the input power.

6. A power supply apparatus comprising:
    a first power converter bypassing input power when a voltage level of the input power having a predetermined voltage level is within a reference voltage level range, and converting the input power to direct current (DC) power having a preset voltage level when the voltage level of the input power is outside of the reference voltage level range; and
    a second power converter converting the power inputted from the first power converter to driving power having a preset voltage level,
    wherein the second power converter is an inductor-inductor-capacitor (LLC) resonant converter having a maximum resonance point at a voltage level higher than the voltage level of the DC power.

7. A power supply apparatus, comprising:
    a first power converter bypassing input power when a voltage level of the input power having a predetermined voltage level range is within a preset reference voltage level range, and converting the input power to DC power having a preset voltage level when the voltage level of the input power is outside of the reference voltage level range;
    a second power converter converting the power inputted from the first power converter to driving power having a preset voltage level and having a maximum resonance point at a voltage equal to the voltage level of the DC power; and
    a controller stopping an operation of the first power converter to bypass the input power to the second power converter when the voltage level of the input power is within the reference voltage level range, and resuming a power conversion operation of the first power converter when the voltage level of the input power is outside of the reference voltage level range.

8. The power supply apparatus of claim 7, wherein the first power converter is a buck converter having a voltage range from the minimum voltage level of the voltage level range of the input power to the voltage level of the DC power as the reference voltage level range.

9. The power supply apparatus of claim 7, wherein the first power converter is a boost converter having the voltage range from the voltage level of the DC power to a maximum voltage level of the voltage level range of the input power as the reference voltage level range.

10. A power supply apparatus comprising:
    a first power converter bypassing input power when a voltage level of the input power having a predetermined voltage level range is within a preset reference voltage level range, and converting the input power to DC power having a preset voltage level when the voltage level of the input power is outside of the reference voltage level range;
    a second power converter converting the power inputted from the first power converter to driving power having a preset voltage level; and
    a controller stopping an operation of the first power converter to bypass the input power to the second power converter when the voltage level of the input power is within the reference voltage level range, and resuming a power conversion operation of the first power converter when the voltage level of the input power is outside of the reference voltage level range,
    wherein the second power converter is an LLC resonant converter having a maximum resonance point at a voltage higher than the voltage level of the DC power.

11. The power supply apparatus of claim 9, further comprising a power factor corrector rectifying and power factor correcting commercial AC power to supply the rectified and corrected power as the input power.

12. A power supply apparatus, comprising:
    a first power converter bypassing input power when a voltage level of the input power having a predetermined voltage level is within a reference voltage level range, and converting the input power to direct current (DC)

power having a preset voltage level when the voltage level of the input power is outside of the reference voltage level range; and a second power converter converting the power inputted from the first power converter to driving power having a preset voltage level and being operated at a maximum duty at the voltage level of the DC power.

13. The power supply apparatus of claim 12, wherein the second power converter is a phase-shifted full-bridge (PSFB) converter.

14. A power supply apparatus, comprising:

a first power converter bypassing input power when a voltage level of the input power having a predetermined voltage level range is within a preset reference voltage level range, and converting the input power to DC power having a preset voltage level when the voltage level of the input power is outside of the reference voltage level range;

a second power converter converting the power inputted from the first power converter to driving power having a preset voltage level and being operated at a maximum duty at the voltage level of the DC power; and a controller stopping an operation of the first power converter to bypass the input power to the second power converter when the voltage level of the input power is within the reference voltage level range, and resuming a power conversion operation of the first power converter when the voltage level of the input power is outside of the reference voltage level range.

15. The power supply apparatus of claim 14, wherein the second power converter is a phase-shifted full-bridge (PSFB) converter.

* * * * *